United States Patent
Korus et al.

(10) Patent No.: US 10,528,713 B2
(45) Date of Patent: Jan. 7, 2020

(54) DISTRIBUTED BIOMETRIC IDENTIFICATION SYSTEM FOR A MOBILE ENVIRONMENT

(71) Applicant: MOTOROLA SOLUTIONS, INC, Chicago, IL (US)

(72) Inventors: Michael F. Korus, Eden Prairie, MN (US); Adam C. Lewis, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/665,539

(22) Filed: Aug. 1, 2017

(65) Prior Publication Data
US 2019/0042715 A1 Feb. 7, 2019

(51) Int. Cl.
G06F 21/32 (2013.01)
H04W 4/021 (2018.01)
G06F 21/62 (2013.01)
H04L 29/06 (2006.01)

(52) U.S. Cl.
CPC ............ *G06F 21/32* (2013.01); *H04W 4/021* (2013.01); *G06F 21/6218* (2013.01);
(Continued)

(58) Field of Classification Search
CPC ............ G07C 9/00031; G07C 9/00563; G06Q 20/32; G06Q 20/40145; G06Q 20/3821;
(Continued)

(56) References Cited

U.S. PATENT DOCUMENTS 9,286,482 B1 3/2016 Dumont et al.
9,465,800 B2 10/2016 Lacey
(Continued)

FOREIGN PATENT DOCUMENTS

CN 105184261 A 12/2015

OTHER PUBLICATIONS

The International Search Report and the Written Opinion, corresponding patent application No. PCT/US2018/043738 filed Jul. 25, 2018, dated Sep. 27, 2018, all pages.

*Primary Examiner* — Nizar N Sivji

(57) ABSTRACT

A method and mobile device for identifying a current user of the mobile device as a trusted user is provided. The mobile device determines that a current user of the mobile device is not the owner of the mobile device. The mobile device obtains a biometric sample of the current user and transmits an identification request message to a distributed identification system. The distributed identification system includes a group of mobile devices, each one that includes biometric data the owner of the device. The identification request message includes the biometric sample of the current user. If the biometric sample matches the sample of one of the mobile devices in the distributed identification system, that device sends an identity response to the originating mobile device. Upon receiving the identity response, the original mobile unit determines if the identity in the identity response matches a known identity of the mobile device, such as a member in the contact list. If so, the original mobile device remains unlocked. If there is no match, the mobile device assumes that the current user is unauthorized and locks the phone or performs other defensive measures.

14 Claims, 2 Drawing Sheets

(52) U.S. Cl.
CPC ............... *G06F 2221/2137* (2013.01); *G06F 2221/2139* (2013.01); *H04L 63/0861* (2013.01)

(58) Field of Classification Search
CPC ....... H04L 63/10; H04L 63/101; H04L 67/22; H04L 63/0861; H04L 12/2816; H04L 9/3231; G06F 21/32; H04W 12/06; H04W 12/04; H04W 12/08; H04W 48/02; H04W 4/02; G06K 9/00006; G06K 9/00885; H04M 2203/6054; H04B 5/0062
See application file for complete search history.

(56) References Cited

U.S. PATENT DOCUMENTS

| | | |
|---|---|---|
| 2003/0126121 A1 | 7/2003 | Khan et al. |
| 2009/0150993 A1* | 6/2009 | Tilley .................... G06F 21/32 726/19 |
| 2010/0207721 A1 | 8/2010 | Nakajima et al. |
| 2010/0216429 A1 | 8/2010 | Mahajan |
| 2011/0275348 A1* | 11/2011 | Clark .................... G06F 21/32 455/411 |
| 2013/0102283 A1* | 4/2013 | Lau .................... H04W 12/06 455/411 |
| 2015/0208431 A1* | 7/2015 | Chen .................... H04W 4/08 370/329 |
| 2015/0324564 A1 | 11/2015 | Sahu et al. |
| 2015/0324565 A1 | 11/2015 | Park et al. |
| 2015/0341130 A1* | 11/2015 | Zhou .................... H04J 3/1694 370/336 |
| 2015/0381614 A1 | 12/2015 | Hildreth et al. |
| 2016/0094550 A1 | 3/2016 | Bradley et al. |
| 2016/0162675 A1 | 6/2016 | Han et al. |
| 2017/0339272 A1* | 11/2017 | Obaidi .................... H04M 3/385 |

* cited by examiner

DISTRIBUTED BIOMETRIC IDENTIFICATION SYSTEM FOR A MOBILE ENVIRONMENT

BACKGROUND OF THE INVENTION

Sophistication in device biometrics will be a net gain for security; as devices become more intelligent, users will no longer need to authenticate to devices but rather will be 'recognized' by them. Recognition will enable a better user experience (UX) for the device owner and better security.

Some devices may automatically lock when they detect that the authorized user is no longer present. While this increases security for the authorized device user, it will create friction for the consensual sharing of a device. Consensual sharing occurs anytime the owner of a device chooses to share their device with another person. If the owner of a device that automatically locks allows another user to use the device, the device will lock, since the owner is no longer using the device. This will make the device unusable to the borrowing user.

Therefore, a need exists for a way to allow a trusted user to borrow a device while disallowing an untrusted user from using the device.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
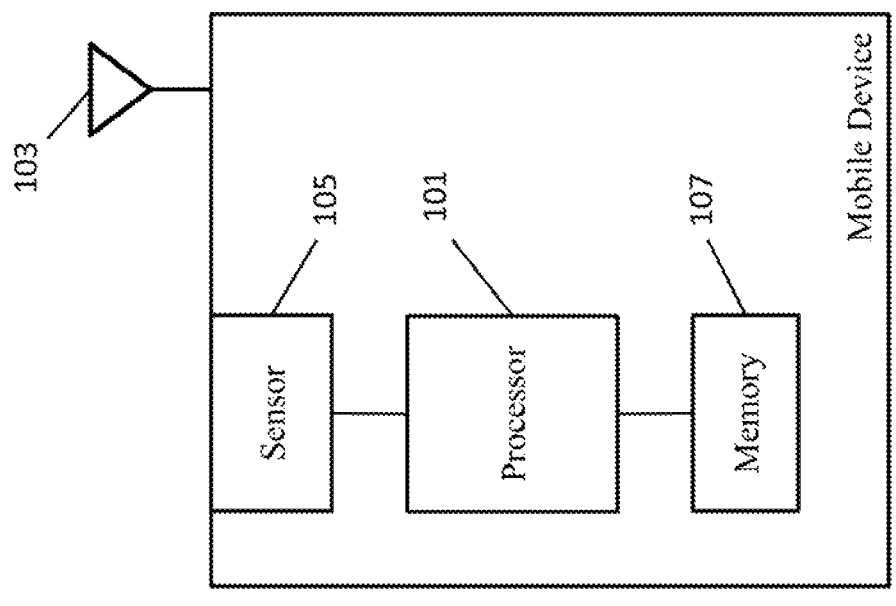
FIG. 1 depicts a mobile device in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment of the present invention provides a method and mobile device for identifying a current user of a mobile device as a trusted user is provided. In an exemplary embodiment, the mobile device determines that a current user of the mobile device is not the owner of the mobile device. In response to this, the mobile device obtains a biometric sample of the current user and transmits an identification request message to a distributed identification system. The distributed identification system includes a group of mobile devices, each one that includes biometric data the owner of that device. The identification request message preferably includes the biometric sample of the current user. If the biometric sample matches the sample of one of the mobile devices in the distributed identification system, that device sends an identity response to the originating mobile device Upon receiving the identity response, the original mobile unit determines if the identity in the identity response matches a known identity of the mobile device, such as a member in the contact list. If so, the original mobile device remains unlocked. If there is no match, the mobile device assumes that the current user is unauthorized and locks the phone or performs other defensive measures.

FIG. 1 depicts a mobile device 100 in accordance with an exemplary embodiment of the present invention. Mobile device 100 preferably includes a processor 101, a transceiver 103, a sensor 105, and memory 107.

Processor 101 is a microprocessor that is effective in receiving biometric inputs from sensor 105 and generating biometric templates based on the user submitted biometric samples. During an initial enrollment period, processor 101 generates and stores an enrolled biometric template of the user in memory 107. Subsequently during user authentication, processor 101 preferably receives a biometric sample from sensor 105, generates a biometric sample template and compares the sample template with the enrolled template. If the comparison exceeds a match threshold, the user is authenticated; otherwise the authentication fails. A successful authentication results in an authenticated identity.

In an exemplary embodiment, processor 101 is configured to determine that a current user of the mobile device is not the owner of the mobile device. Further, processor 101 is also configured to obtain a biometric sample of the current user and to determine if an identity associated with the biometric matches a known identity of the mobile device.

Processor 101 is further configured to lock the mobile device if the identity does not match an identity known to the processor. Processor 101 is further configured to keep the mobile device in an unlocked state if the identity matches an identity known to the processor, which is preferably accomplished by starting a timer and upon expiration of the timer, requiring re-authentication of the owner of the mobile device.

Processor 101 is configured to use various methods to determine if the identity matches a known identity of the mobile device. These include, for example, determining if the known identity is in an address book associated with the mobile device, if the known identity is in a list of incident responders associated with the mobile device, if the known identity is in a talkgroup that the mobile device is enrolled in, or if the known identity is located within a predetermined geofence area.

Processor 101 is a microprocessor that is effective in transmitting and receiving inputs from transceiver 103 and making calculations based on these inputs. Transceiver 103 communicates over the air with base stations or other wireless devices utilizing radio frequency technology. In accordance with an exemplary embodiment, transceiver 103 transmits an identification request message that includes a biometric sample of the current user of mobile device 100 to a distributed identification system. Transceiver 103 also receives at least one identity response, preferably including at least one identity response including an identity associated with the biometric sample of the current user, from at least one member of the distributed identification system.

Figure 2:
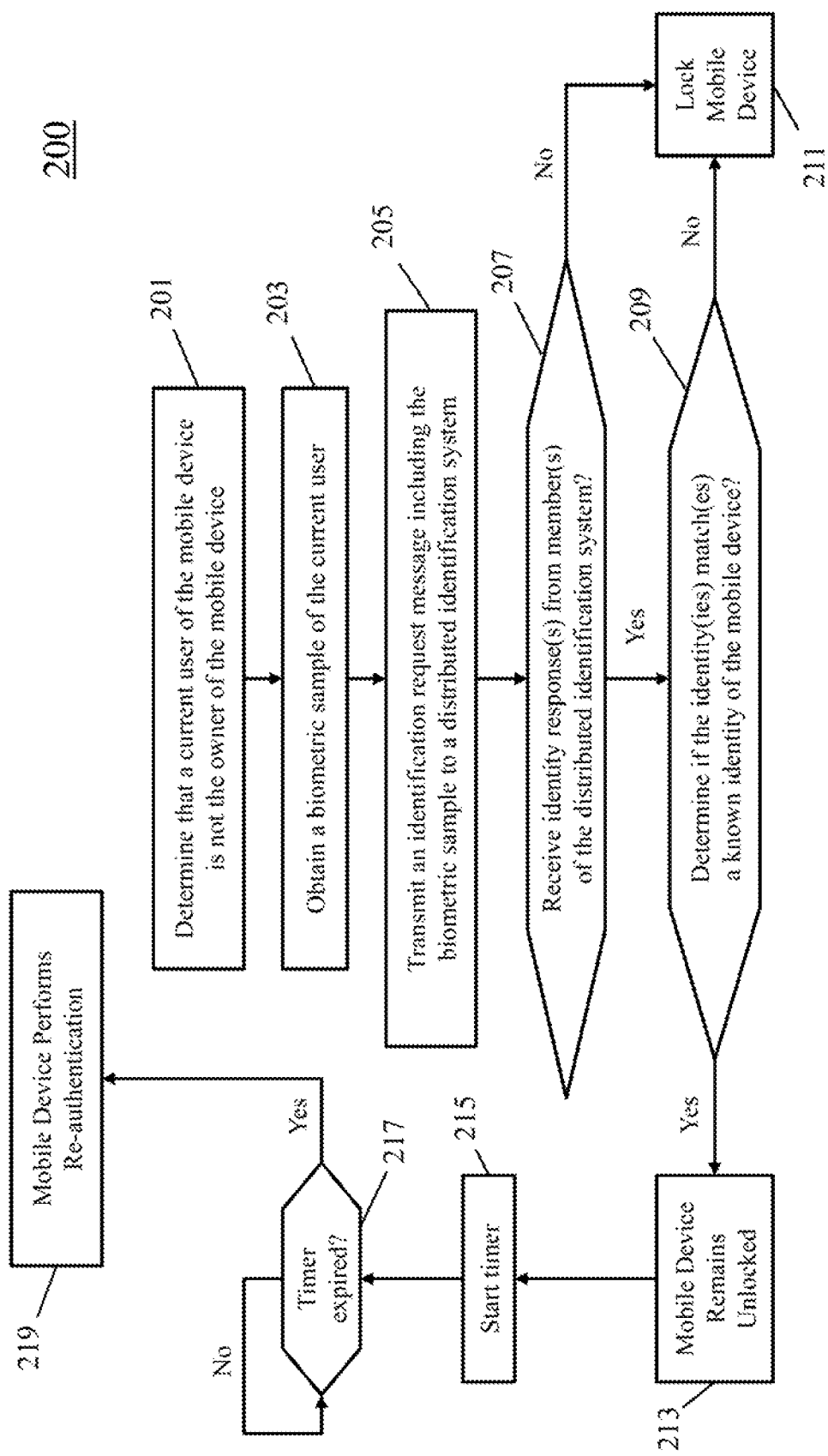
FIG. 2 depicts a flowchart of a method of identifying a current user of a mobile device as a trusted user in accordance with an exemplary embodiment of the present invention.

FIG. 2 depicts a flowchart 200 of a method of identifying a current user of mobile device 100 as a trusted user in accordance with an exemplary embodiment of the present invention. In this exemplary embodiment, mobile device 100 is running continuous authentication to ensure that the owner of mobile device 100 is in possession of mobile device 100. In this exemplary embodiment, a method is provided of identifying a user as trusted or untrusted in a distributed fashion by utilizing a mobile distributed user-identification system (MDUIS). The MDUIS comprises a plurality of mobile devices that each include biometric information pertaining to users. As an example, this exemplary embodiment can be utilized at public safety incident scenes, vehicular area networks, at-home consumer usage, or any other location where validation of a user borrowing another's mobile device is helpful.

Mobile device 100 determines (201) that a current user of mobile device 100 is not the owner of mobile device 100. In an exemplary embodiment of an authorized use, the owner of mobile device 100 hands mobile device 100 to another person, who becomes the current user of mobile device 100. The owner of mobile device 100 may be, for example, allowing the current user to place a phone call, talk to another person in an ongoing phone call, visit a webpage, view a photo, or any other use of mobile device 100.

However, there could be situations when an unauthorized person takes mobile device 100 from the owner without the owner's permission. Whether the use of mobile device 100 is desired by the owner of mobile device 100 or not, mobile device 100 detects that the current user of mobile device 100 is not the owner of mobile device 100. In either scenario, mobile device 100 determines whether the current user is authorized to use mobile device 100, in which case mobile device 100 will remain unlocked, or is an unauthorized user, in which case mobile device 100 will lock.

After determining that a current user is not the owner of mobile device 100, mobile device 100 obtains (203) a biometric sample of the current user. The biometric sample can be any feature of the current user that uniquely identifies the identity of the current user. For example, the biometric sample can be a facial image, fingerprint, voice sample, or iris scan of the current user.

Mobile device 100 transmits (205) an identification request message including the biometric sample to a distributed identification system. The distributed identification system comprises a plurality of mobile devices that include biometric data for a plurality of users. In accordance with an exemplary embodiment, the collection of mobile devices within a certain proximity of the mobile device represents a distributed database of biometrics which can be harnessed to implement a distributed, mobile identification system.

In accordance with an exemplary embodiment, upon receiving the identification request message, each member of the distributed identification system compares the received biometric sample to its enrolled sample and renders a decision. If there is a match, the matching member of the distributed identification system outputs the associated user's identity and the matching device returns the identity to the requesting mobile device 100. For example, the mobile device owned by the current user would preferably return the identity of the current user to the borrowed mobile device 100.

Mobile device 100 determines (207) if it receives an identity response from a member of the distributed identification system. If no identity responses are received within a predetermined time period, mobile device 100 locks (211), thereby preventing the current user from utilizing mobile phone 100.

If mobile device 100 has received at least one identity response from a member of the distributed identification system, mobile device 100 determines (209) if the identity match is of a user known to mobile device 100. If mobile device 100 does not know the identified user, mobile device 100 locks (211).

If mobile device 100 matches the identified user, for example by having a contact entry associated with the identified user in the phone book of the mobile device, mobile device 100 remains (213) unlocked for the current user. Other examples of ways in which mobile device 100 can match the identified user include, but are not limited to, having an entry in an incident responders list, being a participant in a talkgroup that the owner of the mobile device is also a participant in, or being located within a geofence area.

FIG. 2 also depicts a further exemplary embodiment. In this exemplary embodiment, mobile device 100 limits the duration of trusted use before the owner of mobile device 100 is required to re-authenticate mobile device 100.

In accordance with this exemplary embodiment, mobile device 100 starts (215) a timer. The length of the timer preferably depends on the trustworthiness of the current user, such as whether the current user is within the address book of mobile device 100 or is within a geofence. Alternately, the owner of mobile device 100 can set the length of the timer.

Mobile device 100 determines (217) if the timer expires. The process continues until the timer expires.

Upon expiration of the timer, mobile device 100 performs (219) re-authentication. This can be performed using any appropriate authentication technique. This prevents a borrowing user who may have fooled the original identity matching from continuing to use mobile device 100 without the permission of the owner of mobile device 100.

An exemplary embodiment thereby provides a method and mobile device that allows for frictionless user authentication without interfering with the ability of the user to share their device with trusted users. By performing an identification matching function of a person borrowing a mobile device in a mobile distributed user-identification system, each mobile device within the mobile distributed user-identification system performs a one-to-one matching. This allows for enhanced matching and authentication without requiring any one device to perform multiple matching functions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of identifying a current user of a mobile device as a trusted user, the method comprising:
   determining that a current user of the mobile device is not the owner of the mobile device;
   obtaining a biometric sample of the current user;
   transmitting an identification request message to a distributed identification system, the identification request message including the biometric sample of the current user;
   receiving at least one identity response from at least one member of the distributed identification system, the at least one identity response including an identity associated with the biometric sample of the current user;
   determining if the identity matches an identity known to the mobile device;
   if the identity matches an identity known to the mobile device, keeping the mobile device in an unlocked state;
   starting a timer; and
   upon expiration of the timer, requiring re-authentication of the owner of the mobile device.

2. The method of claim 1, the method further comprising the step of, if the identity does not match an identity known to the mobile device, locking the mobile device.

3. The method of claim 1, wherein the distributed identification system comprises a plurality of mobile devices.

4. The method of claim 3, wherein the distributed identification system comprises a plurality of mobile devices within a predetermined distance of the mobile device.

5. The method of claim 1, wherein the step of determining if the identity matches a known identity of the mobile device comprises determining if the known identity is in an address book associated with the mobile device.

6. The method of claim 1, wherein the step of determining if the identity matches a known identity of the mobile device comprises determining if the known identity is in a list of incident responders associated with the mobile device.

7. The method of claim 1, wherein the step of determining if the identity matches a known identity of the mobile device comprises determining if the known identity is in a talkgroup that the mobile device is enrolled in.

8. The method of claim 1, wherein the step of determining if the identity matches a known identity of the mobile device comprises determining if the known identity is located within a predetermined geofence area.

9. A mobile device comprising:
   a processor configured to:
      determine that a current user of the mobile device is not the owner of the mobile device; and
      obtain a biometric sample of the current user; and
   a transceiver configured to:
      transmit an identification request message to a distributed identification system, the identification request message including the biometric sample of the current user; and receive at least one identity response from at least one member of the distributed identification system, the at least one identity response including an identity associated with the biometric sample of the current user;

and wherein the processor is further configured to determine if the identity matches an identity known to the mobile device;

wherein the processor is further configured to:
- lock the mobile device if the identity does not match an identity known to the processor;
- start a timer; and
- upon expiration of the timer, require re-authentication of the owner of the mobile device.

10. The mobile device of claim 9, wherein the processor is further configured to lock the mobile device if the identity does not match an identity known to the processor.

11. The mobile device of claim 9, wherein the processor is configured to, at the step of determining if the identity matches a known identity of the mobile device, determine if the known identity is in an address book associated with the mobile device.

12. The mobile device of claim 9, wherein the processor is configured to, at the step of determining if the identity matches a known identity of the mobile device, determine if the known identity is in a list of incident responders associated with the mobile device.

13. The mobile device of claim 9, wherein the processor is configured to, at the step of determining if the identity matches a known identity of the mobile device, determine if the known identity is in a talkgroup that the mobile device is enrolled in.

14. The mobile device of claim 9, wherein the processor is configured to, at the step of determining if the identity matches a known identity of the mobile device, determine if the known identity is located within a predetermined geofence area.

* * * * *